United States Patent

[11] 3,587,788

| [72] | Inventors | John Myers Beach;<br>Edgar Crain Oglesbee; Arthur Roger White; George Stephen Ziegler; Harry Hamilton Cecil, Dayton, Ohio |
|---|---|---|
| [21] | Appl. No. | 750,890 |
| [22] | Filed | Aug. 7, 1968 |
| [45] | Patented | June 28, 1971 |
| [73] | Assignee | to said Beach |
| | | Division of Ser. No. 636,231, Apr. 7, 1967, Pat. No. 3,404,757. Continuation of Ser. No. 416,996, Dec. 9, 1964, abandoned. |

[54] AUTOMATICALLY OPERABLE BRAKE APPARATUS FOR TRAILER VEHICLES
2 Claims, 18 Drawing Figs.

[52] U.S. Cl. .................................................. 188/71.7, 188/72.6, 188/106, 188/196
[51] Int. Cl. .................................................. F16d 65/44

[50] Field of Search........................................... 188/73, 73 (CL), 72 (C), 196 (M), 106 (F)

[56] References Cited
UNITED STATES PATENTS

| 2,731,112 | 1/1956 | Berrows .................... | 188/73 |
| 3,132,724 | 5/1964 | Ansteth ....................... | 188/73 |
| 3,244,260 | 4/1966 | Frager ......................... | 188/106FX |

FOREIGN PATENTS

| 1,372,438 | 8/1964 | France ......................... | 188/73 |

Primary Examiner—George E. A. Halvosa
Attorney—Jeffers and Young ABSTRACT: A disc brake has a piston within a housing and the piston engages a brake pad to apply the brake pad against the brake disc. The piston includes a stud with an end portion which also engages the friction pad. An actuator is located adjacent the head of the stud and has a cam surface engageable by the stud and upon rotation thereof, the stud and attached piston are adjusted toward the brake disc, thus adjusting the position of the brake pad relatively to the brake disc.

INVENTORS
John M. Beach
Harry H. Cecil
Edgar C. Oglesbee
Arthur R. White
George S. Ziegler

AUTOMATICALLY OPERABLE BRAKE APPARATUS FOR TRAILER VEHICLES

This application is a Divisional application of Ser. No. 636,231, filed Apr. 7, 1967, now U.S. Pat. No. 3,404,757 which is a continuation of application Ser. No. 416,996 filed Dec. 9, 1964 now abandoned.

This invention relates to vehicle apparatus. The invention relates more particularly to trailer vehicle apparatus. This invention relates still more particularly to towing and braking apparatus for trailer vehicles.

In the past, numerous types of apparatus have been created by which trailer hitch apparatus has included means for automatically braking the trailer vehicle. However, such trailer hitch apparatus has included means for braking the trailer vehicle only when the trailer vehicle is being towed in a forward direction by a tow vehicle. In the past, during pushing operation upon a trailer vehicle in a reverse direction, there has been no braking means carried by the trailer for stopping the trailer vehicle or for decreasing the rate of movement thereof. Some apparatus has provided braking operation in reverse movement of a trailer vehicle through interconnections between the brake mechanism of the two vehicle and the brake mechanism of the trailer vehicle. However, such interconnections are objectionable.

It is highly desirable to have hitch and brake means by which a trailer vehicle is automatically braked in either direction of movement. Simplification and ease in attachment of the trailer vehicle to the tow vehicle is desirable. The size of the tow vehicle in consideration of the size and load of the trailer vehicle can be much smaller if the trailer vehicle has brake apparatus by which the trailer vehicle is automatically braked in both forward and reverse directions of movement. Furthermore, complete safety of operation requires braking operation of a trailer vehicle in any direction of movement of the trailer vehicle.

It is an object of this invention to provide trailer hitch and brake apparatus which includes means for automatically braking wheel structure of a trailer vehicle when the trailer vehicle is being pulled by a tow vehicle and when the trailer vehicle is being pushed in a reverse direction by the tow vehicle.

It is another object of this invention to provide brake apparatus by which hydraulic and mechanical operator means are combined in a single brake unit.

It is another object of this invention to provide automatic brake adjustment mechanism.

Other objects and advantages reside in the construction of parts, the combination thereof, the method of manufacture, and the mode of operation, as will become more apparent from the following description.

Figure 1:
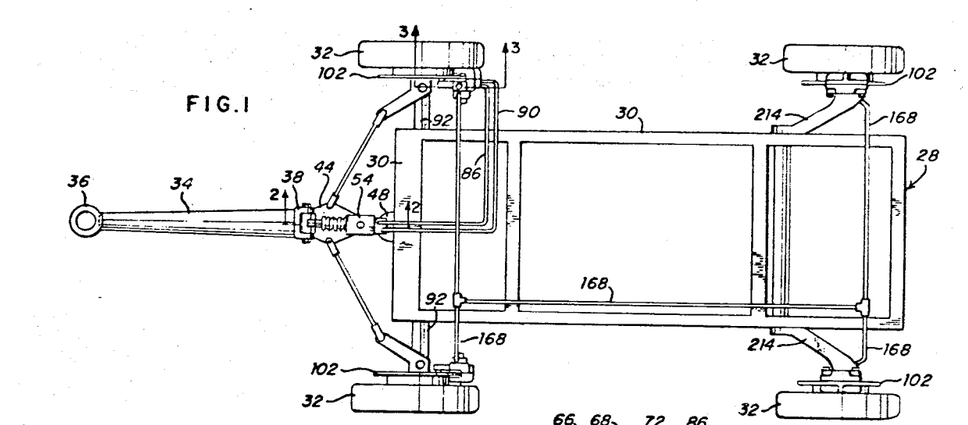
FIG. 1 is a top plan view of a trailer frame and wheel structure with which tow and brake apparatus of this invention is combined.
Figure 2:
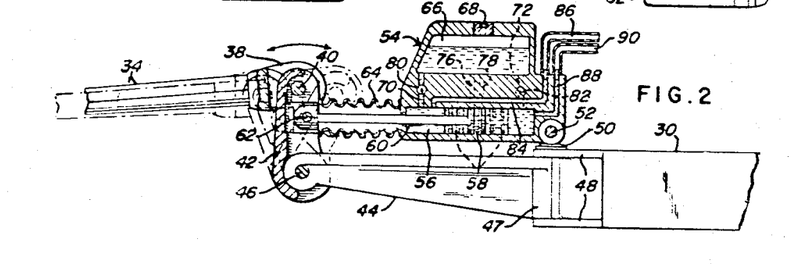
FIG. 2 is an enlarged fragmentary sectional view taken substantially on line 2-2 of FIG. 1.

Referring to the drawings in detail, FIG. 1 illustrates a trailer vehicle 28 provided with a frame 30, having wheel structures 32 and a tow bar 34. The tow bar 34 has an end portion 36 which is adapted to be connected to a tow vehicle (not shown) of any suitable type. The tow bar 34 is adapted to be in a generally horizontal position, as shown in FIG. 2, when joined to a tow vehicle. The tow bar 34 has an opposite end portion 38 which is pivotally connected by means of a pin 40, to one end of a yoke or lever 52, as shown in FIG. 2. The yoke 42 is adapted to be normally in a generally vertical position as it extends downwardly from the tow bar 34. The opposite or lower end of the yoke 42 is pivotally joined to a turning plate 44 by means of a pin 46.

The turning plate 44 has a rearward portion 47 which is pivotally joined to a bracket 48 which is carried by the forward part of the frame 30. Any suitable means such as a connector 50 is supported by the bracket 48 for rotative movement about the axis of pivotal movement of the turning plate 44. Pivotally attached to the connector 50 by means of a horizontally disposed pin 52 is a housing 54. Thus, the housing 54 is pivotally movable about a vertical axis with pivotal movement of the plate 44 and the housing 54 is pivotally movable about a horizontal axis established by the pin 52.

The housing 54 has an elongate cavity portion or member 56 and a reservoir portion or member 66. Within the cavity portion 56 is an axially movable piston 58. The reservoir 66 and the cavity 56 may be within separate housing structures, rather than within a single housing structure.

A piston rod 60 is attached to the piston 58 and extends from the housing 54 and is pivotally joined to the yoke 42 intermediate the ends thereof by a pin 62.

A flexible cover member 64 is shown in covering relation to the rod 60.

The reservoir portion 66 contains a fluid such as an oil or the like. A plug 68 in the upper part of the housing 54 is removable for communication with the reservoir 66. A passage or conduit 70 in the housing 54 joins the reservoir 66 to the elongate cavity 56 adjacent the forward end thereof. A passage or conduit 72 joins the reservoir 66 to the elongate cavity 56 adjacent the rearward end thereof. Spaced-apart passages or conduits 76 and 78 join the reservoir 66 to the cavity 56 at positions intermediate the passages 70 and 72.

A check valve 80 is disposed within the passage 70 and permits flow of fluid therethrough only in a direction from the reservoir 66 to the cavity 56. A check valve 82 is disposed within the passage 72 and permits flow of fluid therethrough only in a direction from the reservoir 66 to the cavity 56.

A passage 84 is also formed within the housing 54 and has an end in communication with the cavity 56 adjacent the forward end thereof. The other end of the passage 84 is joined to a fluid conduit 86 which is connected to the housing 54. A passage 88 is also formed with the housing 54 and communicates with the cavity 56 adjacent the rearward end thereof. A fluid conduit 90 is joined to the housing 54 n communication with the passage 88.

As shown in FIG. 1, the fluid conduits 86 and 90 extend from the housing 54 to one of the wheel structures 32 of the trailer vehicle 28. Herein the conduits 86 and 90 are shown extending to the right front wheel structure 32 of the trailer vehicle 28.

Figures 3, 4, 6, 7, 8:
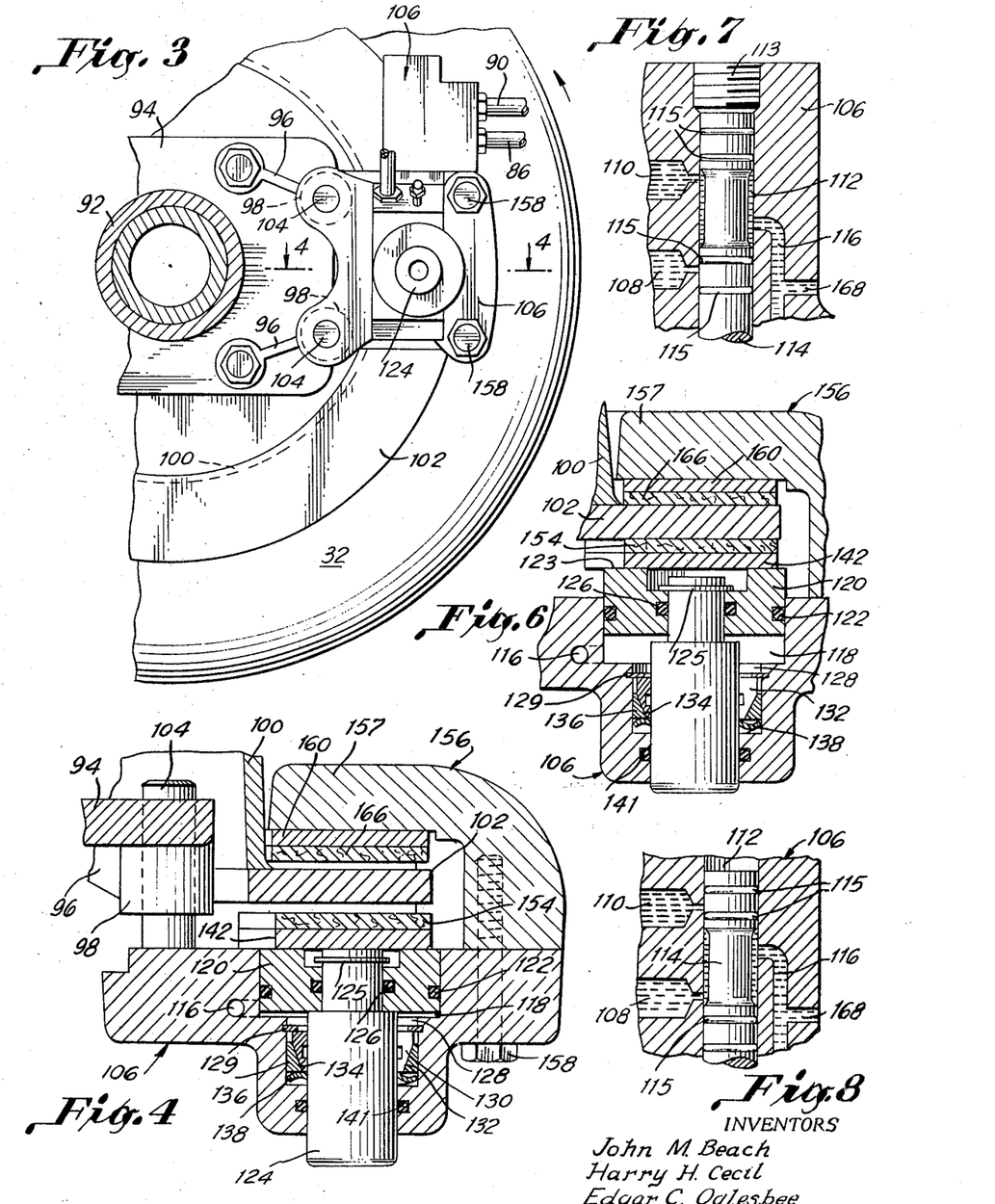
FIG. 3 is an enlarged fragmentary sectional view taken substantially on line 3-3 of FIG. 1.
FIG. 4 is an enlarged fragmentary sectional view taken substantially on line 4-4 of FIG. 3.
FIG. 6 is an enlarged fragmentary sectional view similar to FIGS. 4 and 5 but showing elements of the apparatus in another position of operation.
FIG. 7 is a fragmentary sectional view showing a portion of the brake control apparatus of its invention.
FIG. 8 is a fragmentary sectional view similar to FIG. 7 but showing the elements of the apparatus in another position of operation.

The front wheel structures 32 of the trailer vehicle 28 are rotatably supported upon suitable bearing means, not shown, at opposite ends of a nonrotatable axle 92, as shown in FIGS. 1 and 3. A support plate 94 is firmly attached to each end of the axle 92, substantially normal thereto. The support plate 94 which is associated with the right front wheel structure 32 is shown in FIG. 3.

A plurality of ribs 96 are carried by the plate 94. Each of the ribs 96 has attached thereto, integrally or otherwise, a sleeve 98, illustrated in FIGS. 3, 4, and 5. An axially extending flange 100 is attached to each wheel structure 32 for rotation therewith and has an annular brake disc 102 rigidly attached thereto. The brake disc 102 is substantially normal to the axis of rotation of the wheel structure 32 by which it is carried. The brake disc 102 is used for braking the wheel structure 32 of which the brake disc 102 is a part.

A stud 104, shown in FIGS. 4, 5, 6, and 12, slidably extends through each of the sleeves 98. Therefore, due to the fact that each support plate 94 carries two of the sleeves 98, there are two studs 104 axially movably carried by each of the plates 94, as each stud 104 is slidably axially movable within its respective sleeve 98. Firmly attached to the pair of studs 104 is a housing 106, shown in FIGS. 3, 4, 5, 6, and 12. Thus, the housing 106 is carried by the studs 104 and the housing 106 is disposed adjacent one surface of the disc 102 and the housing 106 is movable toward and away from the disc 102 as the studs 104 axially move within the sleeves 98.

Figures 12, 13:
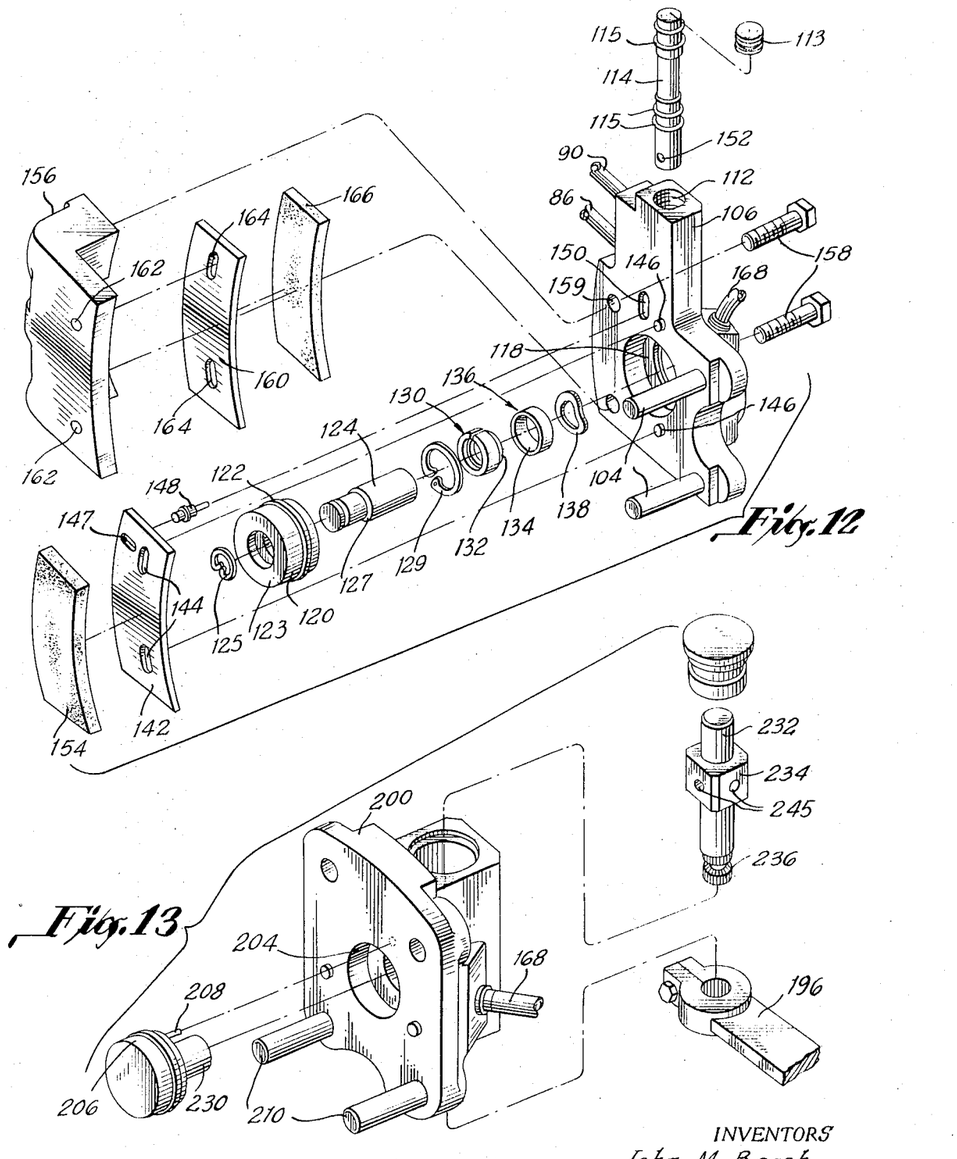
FIG. 12 is an exploded perspective view of the apparatus sown in FIGS. 4 and 5.
FIG. 13 is an exploded perspective view of the apparatus of FIGS. 9, 10, and 11.

The fluid conduits 86 and 90 are joined to the housing 106, as shown in FIGS. 3 and 12 and as illustrated in FIGS. 14, 15, 16, and 17. Within the housing 106 there is a passage 108 which communicates with the conduit 86 and a passage 110 which communicates with the passage 90, as illustrated in FIGS. 14, 15, 16, and 17. The passages 108 and 110 extend within the housing 106 to an elongate bore 112. The bore 112 is closed at one end thereof by a plug 113, as shown in FIGS. 7, 12, 14, 15, 16, and 17. Axially movable within the bore 112 is an elongate valve 114. Sealing ring members 115 encompass the valve 114 and engage the walls of the bore 112.

Figures 5, 9, 10, 11:
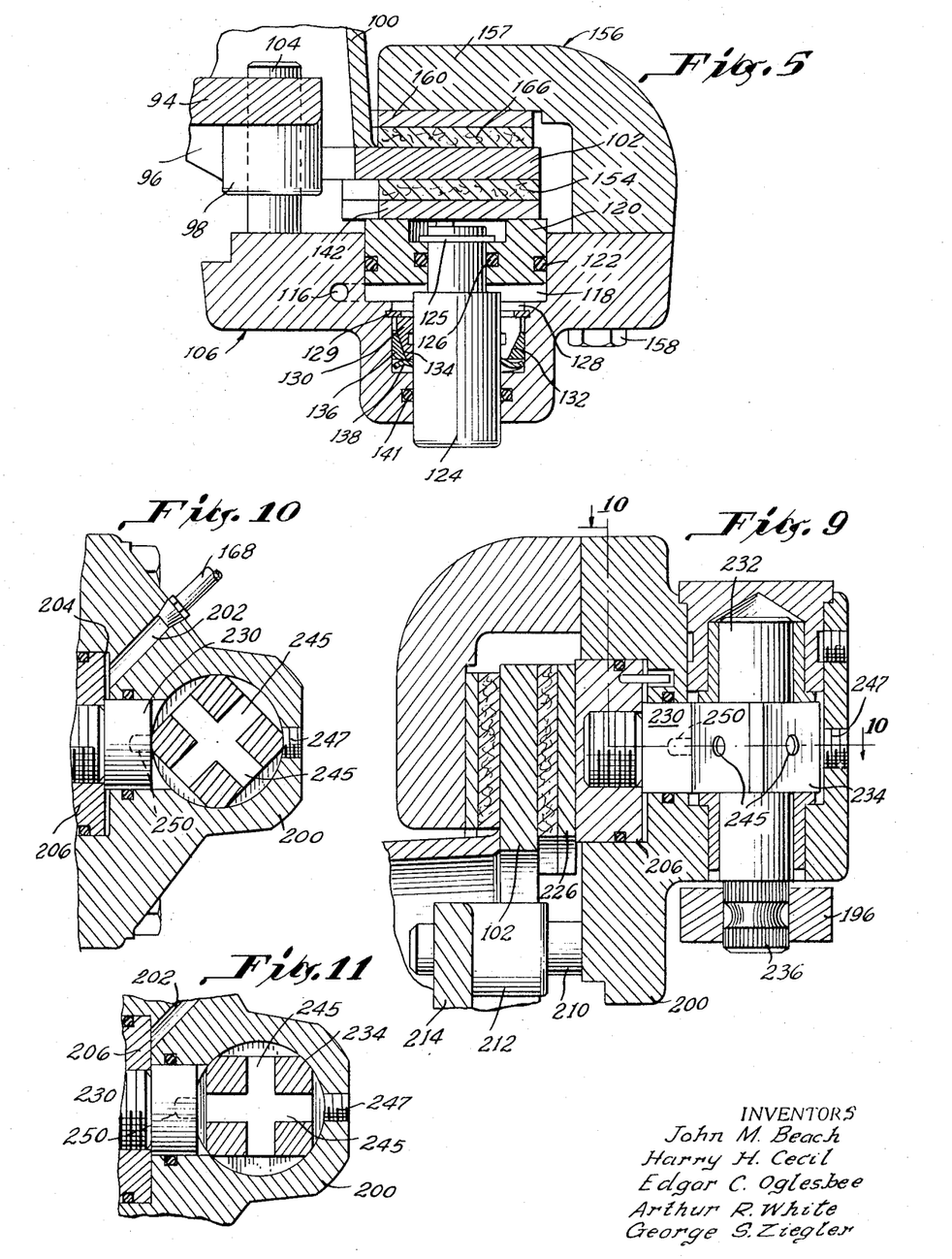
FIG. 5 is an enlarged fragmentary sectional view similar to FIG. 4 but showing elements of the apparatus in a position of operation.
FIG. 9 is a sectional view showing wheel structure brake apparatus which is operable by fluid or by mechanical means.
FIG. 10 is a fragmentary sectional view taken substantially on line 10-10 of FIG. 9.
FIG. 11 is a fragmentary sectional view similar to FIG. 10 and showing a portion of the apparatus of FIG. 10 in another position of operation.

Also, in communication with the bore 112 is a passage 116. The passage 116 extends within the housing 106 to a cavity 118, as shown in FIGS. 4, 5, and 6. Within the cavity 118 is fluid motor means in the form of a piston 120 which has an encompassing annular sealing member 122 in engagement with the wall of the cavity 118. The piston 120 is axially movable within the cavity 118. For a purpose discussed below, the piston 120 has an end surface 123, shown in FIG. 12, which is provided with any suitable antifriction material, such as Teflon or the like.

A stem 124 extends through the piston 120 and is slidably axially movable with respect thereto. A snapring 125 is secured to the stem 124 adjacent the end thereof and retains the piston 120 upon the stem 124 as the piston 120 is axially movable between the snapring 125 and a shoulder 127 of the stem 124. A sealing ring 126 encompasses the stem 124 and engages the central portion of the piston 120. The stem 124 is axially movable with respect to the housing 106.

The stem 124 extends into a recess 128. Encompassing the stem 124 within the recess 128 and spaced from the stem 124 is a snapring 129 which is partially disposed within the wall of the recess 128. A split lockring 130 snugly encompasses the stem 124 and has a tapered outer surface 132 which engages a tapered inner surface 134 of a collar 136, as shown in FIGS. 4, 5, 6, and 12. A resilient washer 138 encompasses the stem 124 in engagement with the end wall of the recess 128 and engages the collar 136 and urges the collar 136 toward the split ring 130. A sealing ring 141, partially disposed within a wall of the recess 128, is also shown encompassing the stem 124 in engagement therewith.

A brake shoe or carrier plate 142 is disposed intermediate the piston 120 and the disc 102. As shown in FIGS. 12, 14, 15, 16, and 17, the carrier plate 142 is provided with a pair of elongate slots 144. A proturberance or lug 146, carried by the housing 106, extends through each slot 144 and retains the carrier plate 142 for limited longitudinal movement with respect to the housing 106. The carrier plate 142 also has a slot 147, through which extends a peg 148. The peg 148 extends through a slot 150 in the housing 106, as shown in FIG. 12, and is threaddedly attached to the valve 114 within a hole 152 therein adjacent the end thereof. Therefore, longitudinal movement of the carrier plate 142 causes axial movement of the valve 114.

A brake pad or engagement member 154 is attached to the carrier plate 142 by any suitable means, such as by adhesive means or by rivets, or the like. Thus, the brake pad 154 is adjacent the disc 102 and is engageable therewith.

An arm 156, shown in FIGS. 4, 5, and 12, is attached to the housing 106 by a pair of bolts 158, each of which extends through an opening 159 in the housing 106 and is threaded into the arm 156, as illustrated in FIG. 12.

The arm 156 has a back portion 157 thereof adjacent the surface of the disc 102 opposite the housing 106. A carrier plate 160 is disposed adjacent the arm 156 and is carried thereby by means of pegs 162, each of which is attached to the back portion 157 of the arm 156 and extends into an elongate slot 164 of the carrier plate 160, as illustrated in FIG. 12. Thus, the carrier plate 160 has limited longitudinal movement with respect to the arm 156. The surface of the carrier plate 160 and/or the surface of the back portion 157 of the arm 156 which is engaged by the carrier plate 160 is provided with suitable antifriction material.

A brake pad or engagement member 166 is attached to the carrier plate 160 by any suitable means, such as by adhesive means or by rivets or the like. Thus, as shown in FIGS. 4, 5, and 6, the brake pad 166 is adjacent one side surface of the disc 102 and the brake pad 154 is adjacent the opposite side surface of the disc 102.

As shown in FIGS. 7, 8, 14, 15, 16, and 17, the passage 116 also has a portion which extends outwardly within the housing 106 and communicates with a conduit 168 which is attached to the housing 106. The conduit 168 is also shown in FIG. 1 as it extends to the brake apparatus associated with the other wheel structures 32 of the trailer vehicle 28.

OPERATION

As stated above, the end portion 36 of the tow bar 34 is adapted to be connected to a tow vehicle. This is the only connection which is required between a tow vehicle and a trailer vehicle which is provided with hitch and brake apparatus of this invention.

As shown in FIG. 2, the tow bar 34 is joined to the yoke 42, and the piston rod 60 is joined to the yoke 42. Therefore, when a tow vehicle which is connected to the tow bar 34 moves forwardly to pull the trailer vehicle 28, the tow bar 34 moves forwardly with the tow vehicle. When the tow bar 34 is moved forwardly, which is to the left, as shown in FIGS. 1 and 2, the yoke 42 is moved to an angularly inclined forward position, as shown in broken lines in FIG. 2. When the yoke 42 moves forwardly to an angularly inclined position, the yoke 42 pulls the piston rod 60 forwardly and moves the piston 58 forwardly within the cavity 56. Due to the fact that the piston rod 60 is operated by the tow bar 34 through the yoke 42, a mechanical advantage and a high degree of sensitivity is obtained in the operation of the piston rod 60. As the yoke 42 moves angularly, there is slight pivotal action of the housing 54 about the pin 52.

Figure 14:
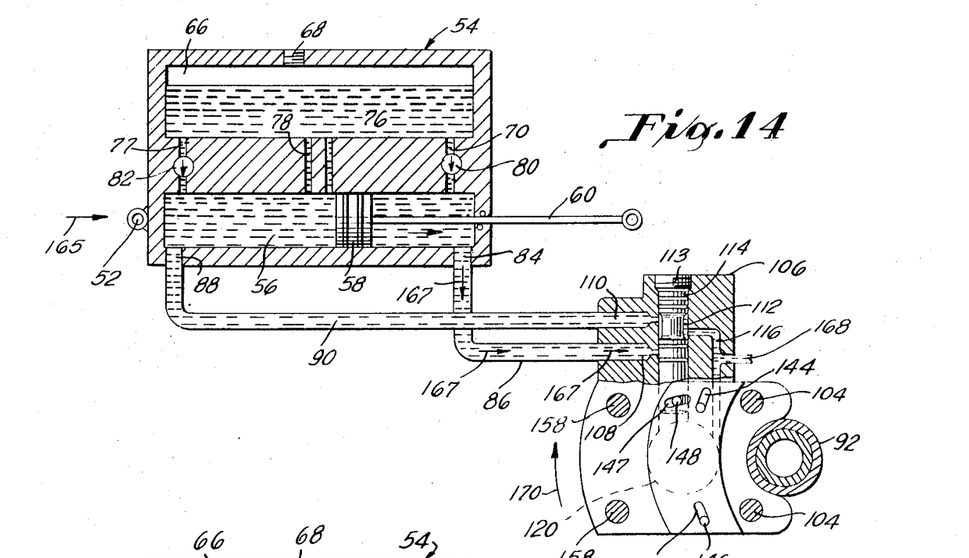
FIG. 14 is a diagrammatic type of view with parts shown in section of the hitch and brake apparatus of this invention.

Forward movement of the trailer vehicle 28 is illustrated diagrammatically in FIG. 14. As viewed in FIG. 14, forward movement is toward the right as illustrated by an arrow 165. The piston rod 60 is pulled to the right, as shown in FIG. 14, by the tow bar 34 and the yoke 42. Thus, when a tow vehicle pulls the trailer vehicle 28, the piston 58 is moved to the right within the cavity 56, as shown in FIG. 14.

The cavity 56 and the conduits 86, 90, and 168 are filled with fluid which has moved thereto from the reservoir 66. Thus, when the piston 58 moves toward the right within the cavity 56, as shown in FIG. 14, the piston 58 applies pressure to the fluid within the cavity 56 which is to the right of the piston 58. As shown, the piston 58 has moved to the right of the passages 76 and 78 within the housing 54. Thus, the pressure of fluid within the cavity 56 to the right of the piston 58 also exists within the passage 70. However, the check valve 80 within the passage 70 permits flow of fluid in the passage 70 in a direction only from the cavity 56 to the reservoir 66. Thus, fluid pressure created by the piston 58 within the cavity 56 is transmitted to the fluid within the conduit 86, as illustrated by arrows 167 in FIG. 14.

The fluid passages or conduits 76 and 78 which extend between the reservoir 66 and the cavity 56 permit flow of fluid therebetween with movement of the piston 58 within the cavity 56.

As stated above, and as shown in the drawings, the fluid conduit 86 extends from the housing 54, which is adjacent the tow bar 34, to the housing 106 which is adjacent the right front wheel structure 32 of the trailer vehicle 28. The conduit 86 communicates with the passage 108 within the housing 106.

As stated above, longitudinal movement of the carrier plate 142 causes axial movement of the valve 114. For a reason discussed below, when the front right wheel structure 32 of the trailer vehicle 28 is rotating in a forward direction, as illustrated by an arrow 170 in FIG. 14, the carrier plate 142 is positioned as shown in FIG. 14, i.e., moved to its extreme clockwise position, as viewed in FIG. 14. Clockwise movement of the carrier plate 142, as shown in FIG. 14, is limited by the lugs 146 which extend through the slots 144 of the carrier plate 142. When the carrier plate 142 is in its extreme clockwise position, as shown in FIG. 14, the valve 114 is moved to its extreme position toward the plug 113. Such longitudinal movement of the valve 114 with movement of the carrier plate 142 results from the connection of the peg 148 to the valve 114 as the peg 148 is also positioned within the slot 147 of the carrier plate 142.

When the valve 114 is at its extreme position toward the plug 113, as shown in FIG. 7 and 14, the end of the passage 108 within the housing 106 is closed and fluid cannot enter the bore 112 from the passage 108. Therefore, fluid within the passage 108 which is under pressure caused by the force of the piston 58 cannot flow. Therefore, the fluid which is within the cavity 56 at the right of the piston 58 within the housing 54 and within the conduit 86 and within the passage 108 of the housing 106 is under static pressure. The static pressure is in direct relationship to the forces exerted by the tow bar 34 as the tow bar 34 tows the trailer vehicle 28 as the tow 34 is connected through the yoke 42 to the piston rod 60.

When the tow vehicle which is pulling the trailer vehicle 28 decreases its rate of travel, the energy stored in the trailer vehicle 28 tends to cause the trailer vehicle 28 to continue its rate of movement. Therefore, the trailer vehicle 28 tends to decrease the distance between the trailer vehicle 28 and the tow vehicle. Thus, the tow bar 34 is moved toward the trailer vehicle 28 as the yoke 42 pivotally moves to a rearwardly inclined position as shown in FIG. 2, as the trailer vehicle 28 continues to move forwardly as illustrated by the arrow 165 in FIG. 15. Thus, there is relative movement between the housing 54 which is attached to the trailer vehicle 28 and piston 58 within the cavity 56 of the housing 54. Thus, the piston 58 becomes disposed with respect to the housing 54 in a manner similar to that illustrated in FIG. 15. Thus, the piston 58 becomes disposed rearwardly of the centrally located passages 78 and 76 within the housing 54. Thus, the piston 58 applies pressure on the fluid at the rearward portion of the cavity 56 as illustrated by an arrow 173 in FIG. 15. Due to the face that the passage 72 has the check valve 82 therein, fluid cannot flow through the passage 72 in a direction from the cavity 54 to the reservoir 66. Therefore, pressure is applied to the fluid within the conduit 90 which extends from the housing 54 to the housing 106, as illustrated by arrows 175 in FIG. 15.

Figure 15:
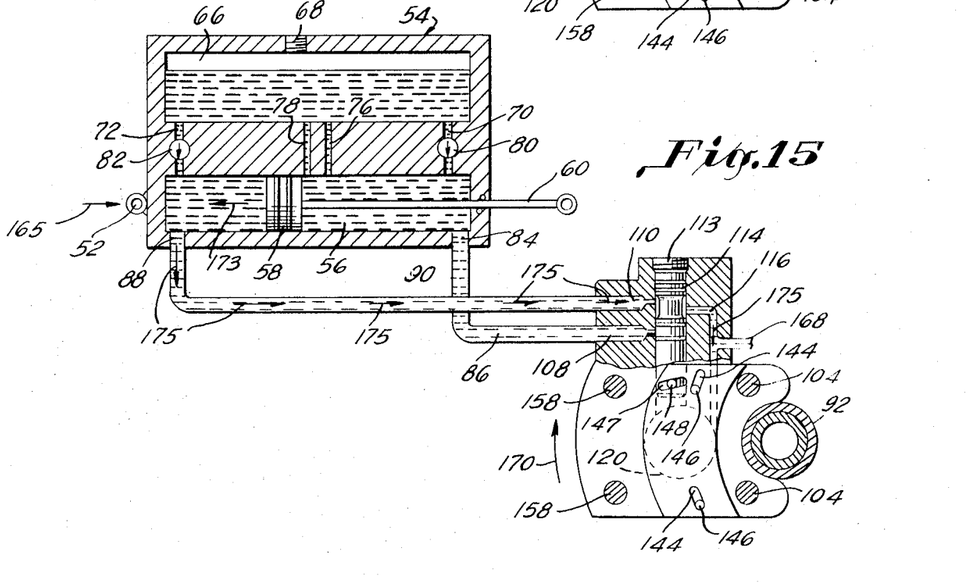
FIG. 15 is diagrammatic type of view similar to FIG. 14, showing elements of the hitch and brake apparatus in another position of operation.

Due to the fact that the right front wheel structure 32 with which the carrier plate 142 is associated is rotating in a forward direction, as illustrated by the arrow 170 in FIG. 15, the valve 114 remains in its extreme position toward the plug 113, as shown in FIG. 15. With the valve 114 positioned as shown in FIG. 15, fluid can flow from the passage 110 into the bore 112, and from the bore 112 fluid flows into the passage 116 within the housing 106. As stated above, the passage 116 communicates with the cavity 118 as illustrated in FIG. 4. Thus, the fluid pressure is applied to the piston 120 within the cavity 118 so that fluid pressure within the cavity 118 causes relative movement between the piston 120 and the housing 106. Thus, the piston 120 moves axially from the position thereof shown in FIG. 4 to the position thereof shown in FIG. 5. The piston 120 thus forces the carrier plate 142 toward the disc 102 and thus the brake pad 154 engages the disc 102.

As fluid pressure occurs within the cavity 118, the housing 106 is caused to move in a direction away from the disc 102 as the housing 106 is carried by the studs 104 which are slidably movable within the sleeves 98. Due to the fact that the arm 156 is attached to the housing 106, the back portion 157 of the arm 156 moves the carrier plate 160 toward the disc 102 and thus moves the brake pad 166 into engagement with the disc 102 at the opposite side surface thereof from that engaged by the brake pad 154, as shown in FIG. 5. Thus, fluid pressure created within the cavity 56 of the housing 54 by the piston 58 creates pressure within the cavity 118, and fluid pressure within the cavity 118 provides forces which urge the brake pads 154 and 166 toward opposite surfaces of the brake disc 102.

As stated above, the passage 116 in the housing 106 is also in communication with the conduit 168 which extends to all of the other wheel structures 32 of the trailer vehicle 28. Therefore, fluid pressure is applied simultaneously to the brake apparatus associated with all of the wheel structures 32 of the trailer vehicle 28.

The amount of the fluid pressure applied to the brake apparatus of the wheel structures 32 of the trailer vehicle 28 is dependent upon the relative forces exerted between the trailer vehicle 28 and its tow vehicle. Such relative forces, of course, depend primarily upon the movement of the tow vehicle relative to the movement of the trailer vehicle 28. If the tow vehicle comes to a complete stop, the braking apparatus automatically operates, as discussed above, to apply pressure to the disc 102 of each wheel structure 32 to completely stop rotation thereof.

If after the trailer vehicle 28 is stopped, it is decided to have the tow vehicle push the trailer vehicle 28 in a reverse direction, the tow bar 34 is again urged to move rearwardly so that the yoke 42 is angularly rearwardly inclined, as illustrated in FIG. 2, and the piston rod 60 and the piston 58 are urged rearwardly to substantially the positions thereof shown in FIG. 15. Thus, fluid pressure is again applied by the piston 58 to the conduit 90 as illustrated by arrows 175 in FIG. 15. Due to the fact that the trailer vehicle 28 stopped with the carrier plate 142 in the position shown in FIG. 15, the carrier plate 142 is in the position shown in FIG. 15 when the tow vehicle begins to push the trailer vehicle 28 rearwardly. Thus, the valve 114 is in the position thereof shown in FIG. 15 when the tow vehicle beings to push the trailer vehicle 28 rearwardly. Therefore, when the pushing action upon the trailer vehicle 28 begins to occur, fluid is forced through the passage 116 in the housing 106 to the cavity 118 and causes braking action to be applied to the disc 102 of each wheel structure 32 as discussed above.

However, as discussed above, the brake pad 166 is carried by the carrier plate 160 and the brake pad 154 is carried by the carrier plate 142. The slots 164 in the carrier plate 160 and the slots 144 in the carrier plate 142 permit limited longitudinal movement of the carrier plates 160 and 142.

As stated above, the surface 123 of the piston 120 is provided with antifriction material and the surface of the back portion 157 of the arm 156 is provided with antifriction material. Therefore, the carrier plates 142 and 160 are permitted to move while braking pressure is applied thereupon by the piston 120. The other wheel structures 32 of the trailer vehicle 28 are also provided with carrier plates similar to the plates 142 and 160 which are longitudinally movable through a limited distance.

Therefore, as the tow vehicle urges the trailer vehicle 28 in a reverse direction, the wheel structures 32 are permitted to rotate slightly in a reverse direction as the carrier plates 160 and 142 are permitted by the slots 164 and 144 therein to move through a limited distance with rotative movement of the wheel structure 32. Thus, even though braking forces are applied to the brake disc 102 of each wheel structure 32 as the tow vehicle forces the trailer vehicle 28 rearwardly, as illustrated by arrows 179 and 181 in FIG. 16, the wheel structures 32 move through a limited degree of rotation.

The reverse movement of the carrier plate 142 with reverse rotative movement of the disc 102 causes reverse movement of the valve 114. This is due to the fact that the valve 114 is connected to the carrier plate 142 through the peg 148 which is connected to the valve 114 and which is disposed within the slot 147 of the carrier plate 142. Thus, the carrier plate 142 moves from the position thereof shown in FIG. 15 to the position thereof shown in FIG. 16. Such movement of the carrier plate 142 is limited by the length of the slots 144 therein.

Figures 16, 17, 18:
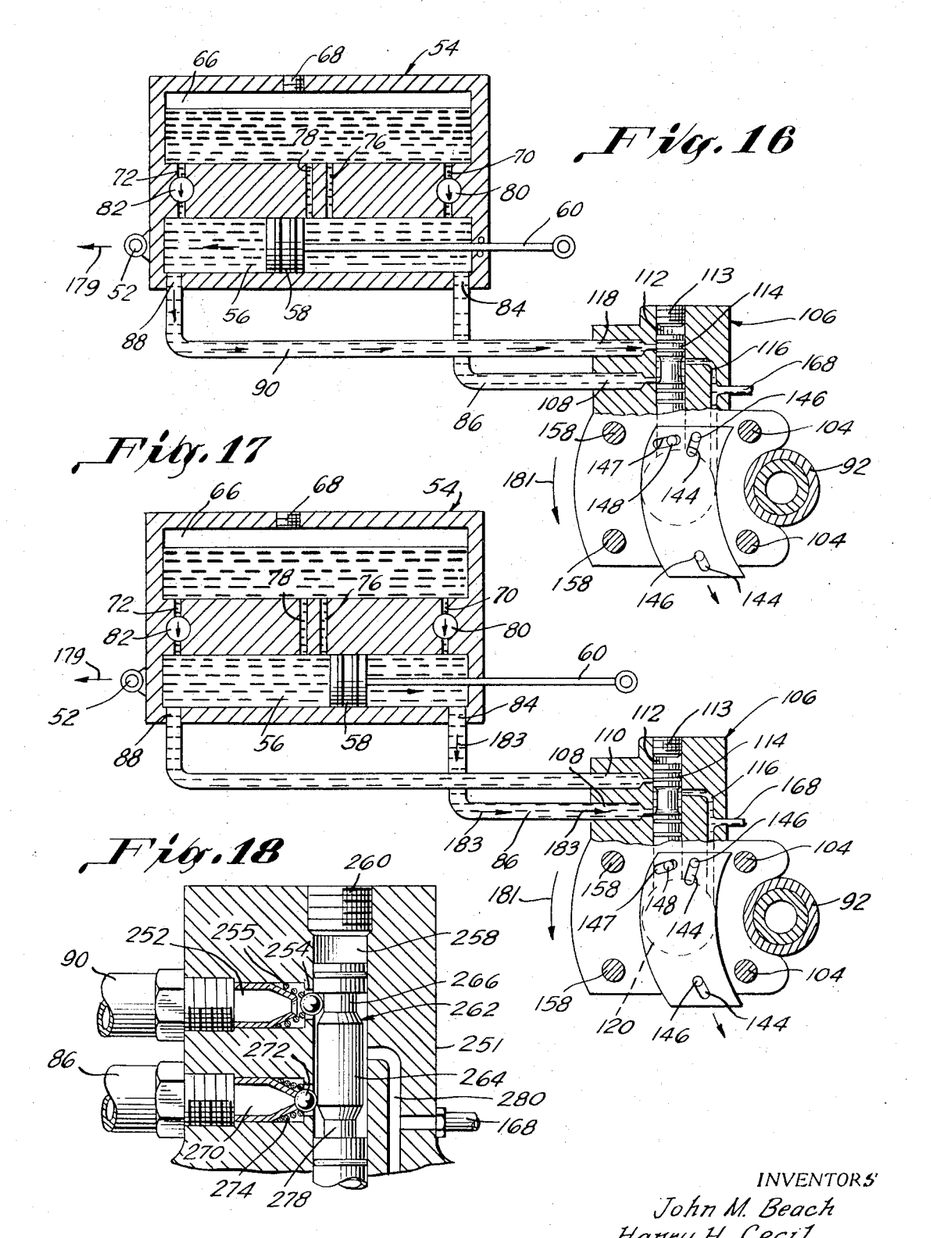
FIG. 16 is a diagrammatic type of view, similar to FIGS. 14 and 15, showing elements of the hitch and brake apparatus in another position of operation.
FIG. 17 is a diagrammatic type of view, similar to FIGS. 14, 15, and 16 showing elements of the hitch and brake apparatus in another position of operation.
FIG. 18 is a fragmentary sectional view of a modification of the apparatus of FIGS. 7 and 8.

Such movement of the carrier plate 142 moves the valve 114 in a direction from the plug 113 to the position of the valve 114 shown in FIG. 16. Such movement of the valve 114 is caused at the instant the trailer wheel structures 32 begin to rotate in a reverse direction. Immediately when the valve 114 moves to the position thereof shown in FIG. 16, the valve 114 prevents flow of fluid from the passage 110 to the passage 116. Therefore, fluid-braking pressure upon the piston 120 through the passage 116 is instantaneously released and braking pressure upon the disc 102 through the brake pads 154 and 166 instantaneously ceases. Thus, the trailer wheel structures 32 freely rotate in a reverse direction, as illustrated by the arrow 181 in FIG. 16, as the trailer vehicle 28 is pushed in a reverse direction by the tow vehicle. During such reverse movement of the trailer vehicle 28, the fluid pressure conditions within the apparatus are as illustrated in FIG. 16. Thus, there is no fluid-braking pressure applied to the discs 102 of the wheel structures 32. The piston 58, however, applies a static pressure to the fluid within the left-hand portion of the cavity 56 and to the fluid within the conduit 90, as illustrated in FIG. 16.

When the tow vehicle reduces its rate of movement as the trailer vehicle 28 is being pushed in a reverse direction by the tow vehicle, relative movement between the piston rod 60 and the housing 54 results. Thus, the piston 58 moves toward the forward portion of the cavity 56, as shown in FIG. 17, as the trailer vehicle 28 momentarily continues moving in a reverse direction at a rate faster than the tow vehicle. The direction of rotation of the trailer vehicle 28 is illustrated by the arrow 179 in FIG. 17.

When the piston 58 moves to a forward position within the cavity 56, the piston 58 causes a fluid pressure to be applied to the conduit 86. Thus, a fluid-braking pressure is exerted through the conduit 86 and through the passage 108 and through the passage 116, as illustrated by arrows 183 in FIG. 17. Thus, fluid pressure is applied to the piston 120 associated with the brake apparatus of each of the wheel structures 32. If the tow vehicle comes to a complete stop, a fluid pressure sufficient to completely stop rotation of the wheel structures 32 is applied automatically by the piston 58 to the brake discs 102 of the wheel structures 32.

Sufficient braking pressure is automatically applied to the brake discs 102 in accordance with the position of the two vehicle with respect to the trailer vehicle 28. Therefore, it is understood that the apparatus of this invention automatically applies the proper braking forces to the wheel structures 32 in accordance with the movement of the tow vehicle with respect to the movement of the trailer vehicle 28, regardless of the direction of movement of the trailer vehicle 28.

Due to the face that the trailer vehicle 28 is joined to a tow vehicle through the piston 58 and the fluid within the cavity 56, a "cushion" condition exists between a tow vehicle and the trailer vehicle 28 during movement of the trailer vehicle 28 by a tow vehicle.

The hitch mechanism as shown in FIGS. 1 and 2 "fails safe." If, for any reason, there should be a failure of any of the braking mechanism, the two bar 34 continues to pull the trailer vehicle 28 through mechanism of the yoke 42 and the turning plate 44. Of course, under such a condition of failure, there would be no braking action but towing action can continue.

AUTOMATIC ADJUSTMENT MECHANISM

FIG. 4 shows the brake elements in completely released positions with the brake pads 154 and 166 out of engagement with the disc 102. FIG. 5 shows the position of the piston 120 and the positions of the brake pads 154 and 166 when fluid pressure is applied thereto for braking the disc 102. After braking action has been completed, the fluid pressure within the cavity 118 is reduced or decreased to substantially zero. However, the brake pads 154 and 166 may remain in slight engagement with the disc 102 and thus are positioned substantially as shown in FIG. 5. It is noted that when the piston 120 moves from the position thereof shown in FIG. 4 to the position thereof shown in FIG. 5, the piston 120 moves into engagement with the snapring 125. The piston 120 continues to move toward the brake disc 102 until the brake pads 166 and 154 firmly engage the brake disc 102. Therefore, as the piston 120 engages the snapring 125, the piston 120 draws the stem 124 toward the brake disc 102. Thus, the piston 120 determines the axial position of the stem 124 with respect to the housing 106. This axial position of the stem 124 is determined in accordance with the amount of relative movement between the piston 120 and the housing 106 necessary for engagement of the brake pads 154 and 166 with the brake disc 102.

Thus, as the brake pads 154 and 166 become worn and are reduced to a lesser thickness during continued use thereof, as shown in FIG. 6, the piston 120 draws the stem 124 axially toward the disc 102 as the piston 120 engages the snapring 125.

The stem 124 is prevented by the lock ring 130 and the collar 136 from axial movement in a direction away from the disc 102. Any movement of the stem 124 in a direction away from the disc 102 is prevented by operation of the resilient washer 138, the collar 136, and the lockring 130. The spring washer 138 resiliently urges the collar 136 toward the lockring 130 and the surface 134 of the collar 136 urges clamping action of the lockring 130 upon the stem 124.

Thus, it is understood that the mechanism as shown in FIGS. 4, 5, and 6 includes automatically adjusting brake apparatus which automatically compensates for wear of the brake pads 166 and 154.

PARKING BRAKE APPARATUS A portion of an arm 196 is shown in FIGS. 9 and 13.

FIGS. 9, 10, 11, and 13 show the brake apparatus of the left rear wheel structure 32. Braking fluid enters a housing 200 from the conduit 168, as illustrated in FIGS. 10 and 11. The conduit 168 communicates with a passage 202 within the housing 200. The passage 202 leads to a chamber 204 shown in FIGS. 9 and 10.

Also, within the chamber 204 is a piston 206. A guide pin 208 is shown disposed within the piston 206 and the housing 200 and may be employed if desired.

The housing 200 is supported by a pair of studs 210, shown in FIG. 13, each of which is slidably movable within a sleeve 212 shown in FIG. 9 and is carried by a support member 214 shown in FIGS. 1 and 9. Attached to the housing 200 is a bracket 218, shown in FIG. 9, which is similar to the arm 156 shown in FIGS. 4, 5, 6, and 12. The brake disc 102 of the rear wheel structure 32 is shown in FIG. 9 and is engaged by brakeshoes 220 and 222 carried by carrier plates 224 and 226, respectively. The carrier plates 224 and 226 are similar to the carrier plates 142 and 160 shown in FIG. 12 and are provided with slots therein, not shown, to permit slight longitudinal movement thereof, as discussed above. The surface of the piston 206 which engages the carrier plate 226 is provided with suitable antifriction material as discussed above with respect to the surface 123 of the piston 120. Thus, fluid pressure applied through the conduit 168 and the passage 202 applied pressure upon the piston 206 which, in turn, applied braking forces to the brake disc 102.

However, braking pressure can also be applied to the disc 102 mechanically. A connector bolt 230 is threadedly connected to the piston 206, as shown in FIGS. 9, 10, and 11. The head of the bolt 230 provides an engagement portion for the piston 206. The head of the bolt 230 is engageable by a rotatable actuator 232 which has cam portion 234. The actuator 232 also has a knurled end 236 which is attached to the arm 196 as shown in FIGS. 9 and 13. Rotative movement of the arm 196 causes rotative movement of the actuator 232 so that the cam portion 234 moves from the position thereof shown in FIG. 11 to the position thereof shown in FIG. 11 to the position thereof shown in FIGS. 9 and 10. When the cam portion 234 is rotatively moved to the position thereof shown in FIGS. 9 and 10, the cam portion 234 engages the head of the bolt 230 and forces the piston 206 toward the disc 102 and applies a braking pressure upon the disc 102 through the brake shoes 220 and 223.

The cam portion 234 of the actuator 232 is provided with a pair of radial passages 245. When the cam portion 234 is rotatively positioned as shown in FIG. 11, a tool, such as a socket wrench or the like, may be passed into the housing 200 after removal of a plug 247. The tool is then inserted through the passage 245 and into a socket 250 in the head of the bolt 230 for rotative movement of the bolt 230 for threaded adjustment thereof within the piston 206. Thus, the structure shown in FIGS. 9, 10, 11, and 13 is hydraulically operable and is also mechanically operable as a parking brake or the like.

Of course, it is to be understood that brake mechanism of FIGS. 9, 10, 11, and 13 may be associated with any of the wheel structures 32 of the trailer vehicle 28.

THE APPARATUS OF FIG. 18

FIG. 18 shows a modification of the valve mechanism illustrated in FIGS. 7, 8, 14, 15, 16, and 17 and may be substituted therefor. FIG. 18 shows the conduits 90 and 86 connected to a housing 251. The conduit 90 communicates with a fluid passage 252. A ball 254 is used to close the fluid passage 252 to prevent flow of fluid into a bore 258. The ball 254 is urged in a direction from the passage 252 by a spring 255. The bore 258 is closed by a removable plug 260. A control member 262 is slidably movable within the bore 258 and has a body portion 264 engageable with the ball 254 for urging the ball 254 to close the passage 252. The control member 262 is operable by movement of a carrier plate, such as the carrier plate 142, in a manner discussed above.

The control member 262 also has a groove 266 into which the ball 254 may move, as shown in FIG. 18, for opening the fluid conduit 252 for flow of fluid therefrom into the bore 258.

The conduit 86 is in communication with a fluid passage 270 within the housing 251. A ball 272 is adapted to close the passage 270. The ball 272 is urged in a direction from the passage 270 by a spring 274. The ball 272 is engageable with the body portion 264 of the control member 262, as shown, or the ball 272 may move into a groove 278 of the control member 262 when the control member 262 is moved to a position toward the plug 260.

Fluid may flow from the bore 258 into a passage 280 for operation of the brake mechanism of the wheel structures 32 of the trailer vehicle 28. The conduit 168 is shown joined to the housing 251 for flow of fluid therefrom in a manner discussed above with respect to the housing 106.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

We claim:

1. In combination with a wheel structure and brake apparatus, operable by fluid means and by mechanical means: a rotatable disc adapted to be attached to said wheel structure, a housing having an access opening and disposed adjacent said brake disc and including a cavity therein, a piston located within said cavity and movable toward and away from said disc, carrier means disposed axially intermediate said brake disc and piston and engageable by said piston, brake pad means attached to said carrier member and engageable by said brake disc under fluid pressure developed by said piston which is biased toward said brake disc to urge said brake pad into frictional engagement with said brake disc, a stud operatively secured to said piston and having a mechanically operatable head, actuator means disposed within said housing and having an opening therein and rotatably disposed adjacent the head of said stud and including a cam surface which is engageable with the head of said stud upon relative movement of said actuator means and thereby causing the cam surface thereof to engage the head of said stud and urge the stud and piston attached thereto toward the brake disc and bringing said brake pad toward said brake disc, means accessible through the opening in said housing and said actuator means to effect mechanical movement of said head, and means for causing rotative movement of said actuator member.

2. The combination of claim 1, wherein said stud is adjustably connected to said piston, whereby the head of said piston is adjustably positionable relatively to said piston, said actuator being transversely movable to effect displacement of said piston by actuation of said stud, and wherein the opening in said actuating means is comprised of radial passage means.

PO-1050
(5/69)

UNITED STATES PATENT OFFICE
CERTIFICATE OF CORRECTION

Patent No. 3,587,788      Dated June 28, 1971

Inventor(s) John Myers Beach; Edgar Crain Oglesbee; Arthur Roger White; George Stephen Ziegler; Harry Hamilton Cecil It is certified that error appears in the above-identified patent and that said Letters Patent are hereby corrected as shown below:

Column 1, line 23, "two" should be "tow".

Specification, page 1, line 20.

Column 2, line 7, "sown" should be "shown".

Specification, page 4, line 5.

Column 3, line 2, "n" should be "in".

Specification, page 7, line 4.

Column 6, line 2, "face" should be "fact".

Specification, page 16, line 10.

Column 8, line 7, "face" should be "fact".

Specification, page 22, line 24.

UNITED STATES PATENT OFFICE
CERTIFICATE OF CORRECTION

Patent No. 3,587,788      Dated June 8 28, 1971

Inventor(s)    John Myers Beach et al.      PAGE - 2

It is certified that error appears in the above-identified patent and that said Letters Patent are hereby corrected as shown below:

Column 8, line 14, "two" should be "tow".

Specification, page 23, line 6.

Column 9, lines 14 and 15, "applied" should be "applies".

Specification, page 26, line 18.

Column 9, line 15, (second occurrence) of "applied" should be "applies."

Specification, page 26, line 19.

Column 9, line 27, delete words starting at beginning of sentence "to" and ending with "FIG. 11".

Specification, page 27, lines 5 and 6.

Signed and sealed this 22nd day of August 1972.

(SEAL)
Attest:

EDWARD M. FLETCHER, JR.      ROBERT GOTTSCHALK
Attesting Officer      Commissioner of Patents